(12) United States Patent
Higami et al.

(10) Patent No.: US 6,685,984 B2
(45) Date of Patent: Feb. 3, 2004

(54) METHOD FOR THE PRODUCTION OF MULTILAYERS

(75) Inventors: Makoto Higami, Tokyo (JP); Kohei Goto, Tokyo (JP); Yoichi Asano, Wako (JP); Ryoichiro Takahashi, Wako (JP); Osamu Kakutani, Sayama (JP); Gen Okiyama, Sayama (JP)

(73) Assignees: JSR Corporation, Tokyo (JP); Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/447,150

(22) Filed: May 29, 2003

(65) Prior Publication Data
US 2003/0228421 A1 Dec. 11, 2003

(30) Foreign Application Priority Data
May 30, 2002 (JP) .......................................... 2002-158034

(51) Int. Cl.[7] .............................. B05D 5/12; H01M 6/00
(52) U.S. Cl. ................. 427/115; 427/372.2; 427/388.4; 427/402; 29/623.5
(58) Field of Search .............................. 427/115, 372.2, 427/388.4, 402; 429/30, 33, 41, 46; 29/623.5

(56) References Cited

U.S. PATENT DOCUMENTS

| | | | | |
|---|---|---|---|---|
| 4,433,082 A | * | 2/1984 | Grot ........................... | 524/544 |
| 4,876,115 A | * | 10/1989 | Raistrick ..................... | 427/115 |
| 5,084,144 A | * | 1/1992 | Reddy et al. ................ | 205/104 |
| 5,449,576 A | * | 9/1995 | Anani ......................... | 429/323 |
| 6,413,675 B1 | * | 7/2002 | Harada et al. .............. | 429/300 |
| 2001/0031430 A1 | * | 10/2001 | Kudo et al. ................. | 430/350 |

* cited by examiner

*Primary Examiner*—Brian K. Talbot
(74) *Attorney, Agent, or Firm*—Arent Fox Kintner Plotkin & Kahn, PLLC

(57) ABSTRACT

The method for the production of multilayers comprises: applying a coating solution (I) which comprises a dissolved or dispersed proton-conductive polymer and a solvent (Is) containing water in amounts from 25 to 60 wt % and an organic solvent in amounts from 75 down to 40 wt %, on an electrode, applying a coating solution (II) which comprises a dissolved or dispersed proton-conductive polymer and a solvent (IIs) containing water in amounts from 0 to less than 25 wt % and an organic solvent in amounts above 75 wt %, on the wet first coating without any drying of the first coating; and drying the coatings to form an electrolyte membrane. The methods can provide multilayers capable of satisfactory power generation properties as an electrode structure by forming an electrolyte membrane on an electrode without causing any penetration of electrolyte into the electrode.

7 Claims, No Drawings

METHOD FOR THE PRODUCTION OF MULTILAYERS

FIELD OF THE INVENTION

The present invention relates to a method for the production of a multilayer of an electrode and an electrolyte membrane suitable for use in fuel cells.

BACKGROUND OF THE INVENTION

In general, fuel cells include a unit of an electrode and an electrolyte membrane.

It is a conventional practice in producing the electrode-electrolyte units that a hydrogen reduction catalyst carried on carbon is mixed with an electrolyte, the resultant electrode paste is applied on carbon paper and heated to form an electrode, and an electrolyte filmy membrane is sandwiched between two electrodes so that a three-layered anode/electrolyte/cathode unit is obtained by hot pressing the superposed membranes.

However, such three-layer bonding methods as mentioned above have technical problems that, for example, interlaminar adhesion is poor, the three-layer integral bonding takes long to complete and mass production cannot be expected since the layers have to be produced individually.

Further, the electrolyte membrane of high heat resistance, for which a demand has been growing recently, has a problem that its thermoplasticity is so insufficient that some restrictions should apply in thermal adhesion.

With such a problem, it has been proposed that a coating solution obtained by dissolving a compound for forming an electrolyte membrane in a solvent can be applied on a previously prepared electrode and thereafter dried.

However, such coating solutions containing the dissolved electrolyte of high heat resistance, will penetrate into the electrodes upon application thereon so that sufficient power generation properties cannot be obtained.

OBJECT OF THE INVENTION

It is an object of the invention to obtain multilayers capable of satisfactory power generation properties as an electrode structure by forming an electrolyte membrane on an electrode without causing any penetration of electrolyte into the electrode.

SUMMARY OF THE INVENTION

The invention provides the following method of producing a multilayer to achieve the above object.

(1) A method for the production of a multilayer comprising an electrode and an electrolyte membrane, the method comprising:

applying a coating solution (I) which comprises a dissolved or dispersed proton-conductive polymer and a solvent (Is) containing water in amounts from 25 to 60 wt % and an organic solvent in amounts from 75 down to 40 wt %, on an electrode;

applying a coating solution (II) which comprises a dissolved or dispersed proton-conductive polymer and a solvent (IIs) containing water in amounts from 0 to less than 25 wt % and an organic solvent in amounts above 75 wt %, on the first coating without any drying of the first coating; and drying the coatings to form an electrolyte membrane.

(2) The method for the production of an multilayer according to above (1), wherein the proton-conductive polymer is sulfonated polyarylene.

(3) The method for the production of a multilayer according to above (1) or (2), wherein the solvent (Is) contains water in amounts from 30 to 50 wt % and an organic solvent in amounts from 70 down to 50 wt %.

(4) The method for the production of a multilayer according to any of above (1) to (3), wherein the solvent (IIs) contains water in amounts from 10 to 20 wt % and an organic solvent in amounts from 90 down to 80 wt %.

(5) The method for the production of a multilayer according to any of above (1) to (4), wherein the coating solution (I) contains the proton-conductive polymer in amounts from 0.1 to 10 wt %.

(6) The method for the production of a multilayer according to any of above (1) to (5), wherein the coating solution (II) contains the proton-conductive polymer in amounts from 5 to 20 wt %.

(7) The method for the production of a multilayer according to any of above (1) to (6), wherein the organic solvent is at least one solvent selected from the group consisting of tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam, preferably from the group consisting of tetrahydrofuran, N,N-dimethylformamide, N,N-dimethylacetamide and N-methyl-2-pyrrolidone.

PREFERRED EMBODIMENTS OF THE INVENTION

The methods for the production of multilayers of the invention will be described in detail hereinafter.

In the methods, two kinds of coating solutions are used. They are obtained by dissolving or dispersing the proton-conductive polymer in the solvent which is different from the other in the water content. The coating solution with larger water content is first applied on an electrode, the one with smaller water content is thereafter applied on the undried first coating, and these coatings are dried to form an electrolyte membrane, thus a multilayer comprising the electrode and the electrolyte membrane is obtained.

Electrode

The electrode for use in the invention is obtained by coating a gas diffusion electrode substrate with a paste which comprises fine particles of catalyst capable of hydrogen reduction supported on conductive porous particles and a proton-conductive polyelectrolyte component.

The conductive porous particles used herein have high structures and large surface areas, e.g., Ketjen black and acetylene black. Examples of the catalyst capable of hydrogen reduction include noble metals, such as platinum, palladium, ruthenium and rhodium; and alloys of these metals and other metals such as chromium, molybdenum, tungsten, titanium, zirconium and cobalt. The amount of the catalyst supported is usually in the range of 10 to 60 wt % based on the conductive porous particles. The paste is applied to a porous gas diffusion electrode substrate, such as carbon paper or carbon cloth, by means of a doctor blade or a spray, so that the electrode is obtained.

The electrode generally ranges from 5 to 100 μm, preferably 5 to 50 μm in the thickness.

Proton-conductive Polymer

Examples of the proton-conductive polymer for the electrolyte membrane include sulfonated polyarylene, sulfonated polyarylene ether, sulfonated polyarylene ketone, sulfonated polybenzimidazole and tetrafluoroethylene copolymers. Of these, sulfonated polyarylene is preferred in order to obtain an electrode structure having good electric characteristics.

The sulfonated polyarylene is prepared by sulfonating a polymer which results from the reaction of a monomer (A) of the following formula (A) with at least one monomer (B) selected from the following monomers (B-1) to (B-4).

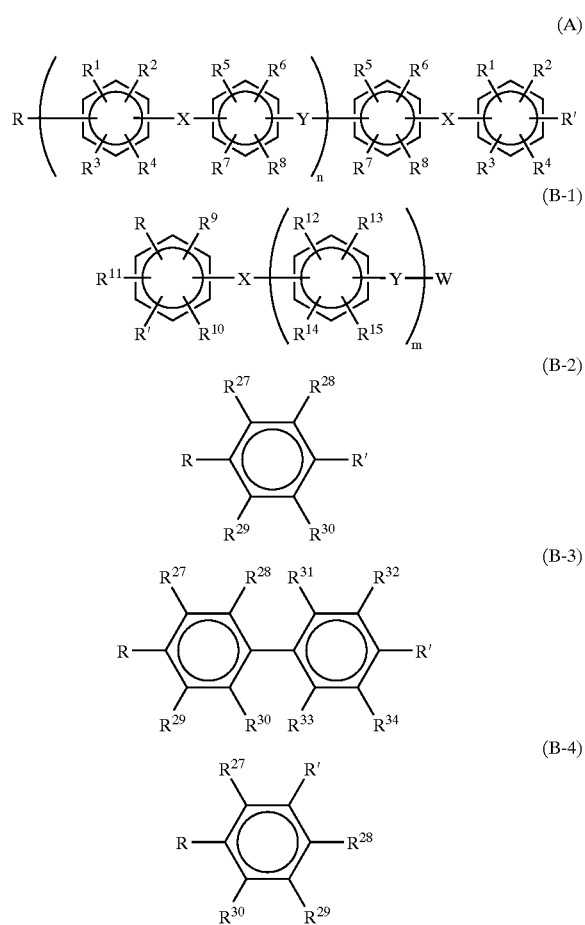

In the formula (A), R and R', which may be the same or different, are independently a halogen atom other than a fluorine atom or a —$OSO_2Z$ group (Z is an alkyl group, a fluorine-substituted alkyl group or an aryl group).

Examples of the alkyl group indicated by Z include methyl and ethyl; those of the fluorine-substituted alkyl group include trifluoromethyl; and those of the aryl group include phenyl and p-tolyl.

$R^1$ to $R^8$, which may be the same or different, are independently at, least one atom or group selected from the group consisting of hydrogen, a fluorine atom, and alkyl, fluorine-substituted alkyl, allyl and aryl groups.

Examples of the alkyl groups include methyl, ethyl, propyl, butyl, amyl and hexyl. Of these, methyl, ethyl and the like are preferred.

Examples of the fluorine-substituted alkyl groups include trifluoromethyl, perfluoroethyl, perfluoropropyl, perfluorobutyl, perfluoropentyl and perfluorohexyl. Of these, trifluoromethyl, pentafluoroethyl and the like are preferred.

Examples of, the allyl groups include propenyl.

Examples of the aryl groups include phenyl and pentafluorophenyl.

X is a divalent electron attracting group, e.g., —CO—, —CONH—, —$(CF_2)_p$— (p is an integer of 1 to 10), —$C(CF_3)_2$—, —COO—, —SO— and —$SO_2$—.

The electron attracting group can be defined as having a Hammett substituent constant of not less than 0.06 in the case of a phenyl group at the m-position and not less than 0.01 in the case of the p-position.

Y is a divalent electron donating group, e.g., —O—, —S—, —CH=CH—, —C≡C— and groups represented by the following formulae:

n is 0 or a positive integer within the upper limit of 100, preferably within the upper limit of 80.

Examples of the monomer of the formula (A) include 4,4'-dichlorobenzophenone, 4,4'-dichlorobenzanilide, bis(chlorophenyl)difluoromethane, 2,2-bis(4-chlorophenyl) hexafluoropropane, 4-chlorobenzoic acid-4-chlorophenyl, bis(4-chlorophenyl)sulfoxide, bis(4-chlorophenyl)sulfone, corresponding compounds to the above compounds except the chlorine atom is replaced with a bromine atom or an iodine atom, and corresponding compounds to the above compounds except the halogen atom substituted at the 4-position is substituted at the 3-position.

Examples of the monomer of the formula (A) further include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis[(4-chlorophenyl)-1,1,1,3,3,3-hexafluoropropyl]diphenyl ether, 4,4'-bis[(4-chlorophenyl)tetrafluoroethyl]diphenyl ether, corresponding compounds to the above compounds except the chlorine atom is replaced with a bromine atom or an iodine atom, corresponding compounds to the above compounds except the halogen atom substituted at the 4-position is substituted at the 3-position, and corresponding compounds to the above compounds except at least one of the groups substituted at the 4-position of diphenyl ether is substituted at the 3-position.

Also available as the monomers of the formula (A) are 2,2-bis[4-{4-(4-chlorobenzoyl)phenoxy}phenyl]-1,1,1,3,3,3-hexafluoropropane, bis[4-{4-(4-chlorobenzoyl)phenoxy}phenyl]sulfone, and compounds represented by the following formulae:

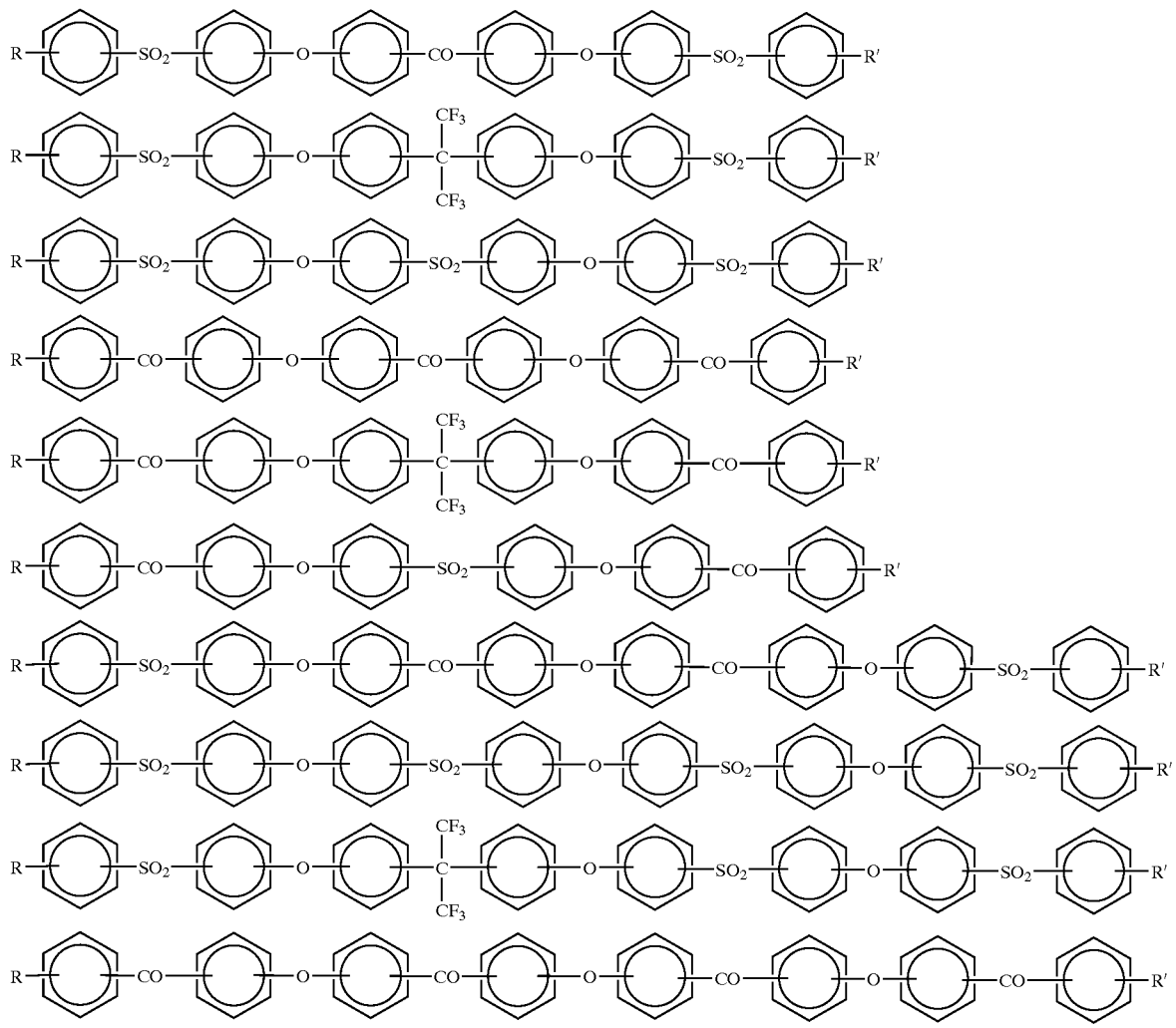

For example, the monomers (A) can be synthesized by the following process.

First, bisphenols connected with the electron attracting group are converted into corresponding alkali metal salts of bisphenol by reaction with an alkali metal, such as lithium, sodium or potassium, or an alkali metal compound, such as an alkali metal hydride, an alkali metal hydroxide or an alkali metal carbonate, in a polar solvent which has a high dielectric constant, such as N-methyl-2-pyrrolidone, N,N-dimethylacetamide, sulfolane, diphenyl sulfone or dimethyl sulfoxide. The alkali metal, etc. is usually used in slight excess based on the hydroxyl groups of the bisphenol, for example usually 1.1 to 2 times equivalent amount, preferably 1.2 to 1.5 times equivalent amount.

Thereafter, the bisphenol is reacted with a halogen-substituted, e.g., fluorine- or chlorine-substituted, aromatic dihalide compound activated by the electron attracting group, such as 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone or 1,3-bis(4-chlorobenzoyl)benzene, in the presence of a solvent azeotropic with water, such as benzene, toluene, xylene, hexane, cyclohexane, octane, chlorobenzene, dioxane, tetrahydrofuran, anisole or phenetole. From the viewpoint of reactivity, the aromatic dihalide compound is preferably a fluorine compound. But taking the subsequent aromatic coupling reaction into account, the aromatic nucleophilic substitution reaction should be carried out such that both ends of the molecule are terminated with a chlorine atom. The active aromatic dihalide compound is used in amounts 2 to 4 molar times, preferably 2.2 to 2.8 molar times the amount of the bisphenol.

The reaction temperature is in the range of 60 to 300° C., preferably 80 to 250° C. The reaction time is in the range of 15 minutes to 100 hours, preferably 1 to 24 hours.

Optimally, the active aromatic dihalide is a chlorofluoro compound as shown below that has two halogen atoms different in the reactivity. The use of this compound is advantageous since the fluorine atom will preferentially undergoes the nucleophilic substitution reaction with phenoxide so that the objective chlorine-terminated active compound can be obtained.

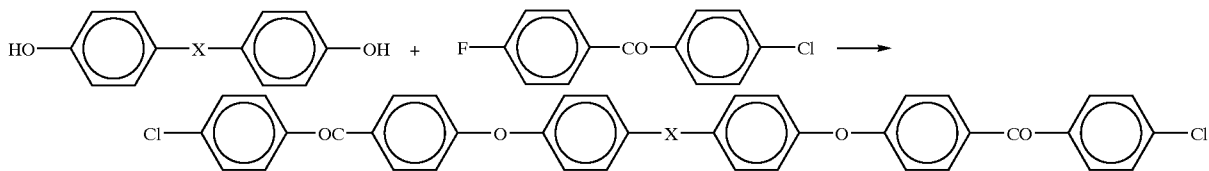

wherein X and Y are as defined in the formula (A).

Other exemplary methods for the synthesis of the monomer (A) include JP-A-2(1990)/159, in which the nucleophilic substitution reaction is jointly carried out with an electrophilic substitution reaction to synthesize the objective flexible compound comprising the electron attracting and electron donating groups.

Specifically, the aromatic bis-halide, such as bis(4-chlorophenyl)sulfone, activated by the electron attracting group is subjected to the nucleophilic substitution reaction with phenol, and the resulting bis-phenoxy substituted compound is subjected to Friedel-Crafts reaction with, e.g., 4-chlorobenzoyl chloride to give the objective compound.

Any of the above-exemplified compounds can be applied to the aromatic bis-halide activated by the electron attracting group. The phenol compound may be substituted, but is preferably unsubstituted from the viewpoints of heat resistance and flexibility. When substituted, the substituted phenol compound is preferably an alkali metal salt. The phenol compound can be substituted with any of the alkali metal compounds listed above. The alkali metal compound is used in amounts 1.2 to 2 molar times the amount of the phenol. In the reaction, the aforesaid polar solvent or the azeotropic solvent with water is employable.

To obtain the objective compound, the bis-phenoxy compound is reacted with an acylating agent chlorobenzoyl chloride in the presence of an activator for the Friedel-Crafts reaction, e.g., Lewis acid such as aluminum chloride, boron trifluoride or zinc chloride. The chlorobenzoyl chloride is used in amounts 2 to 4 molar times, preferably 2.2 to 3 molar times the amount of the bis-phenoxy compound. The Friedel-Crafts reaction activator is used in 1.1 to 2 times equivalent amount based on 1 mol of the active halide compound, such as an acylating agent chlorobenzoic acid. The reaction time is in the range of 15 minutes to 10 hours, and the reaction temperature is in the range of −20 to 80° C. As a solvent, chlorobenzene, nitrobenzene or the like that is inactive in the Friedel-crafts reaction can be used.

Examples of such monomers (A) include compounds represented by the following formulae:

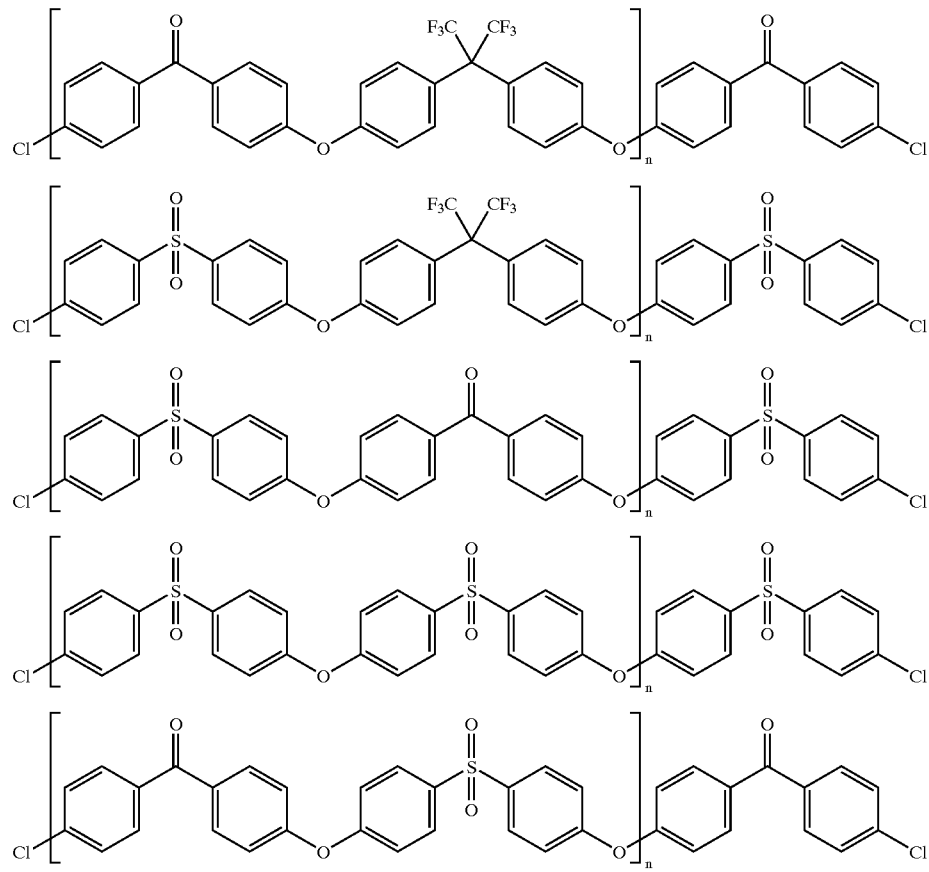

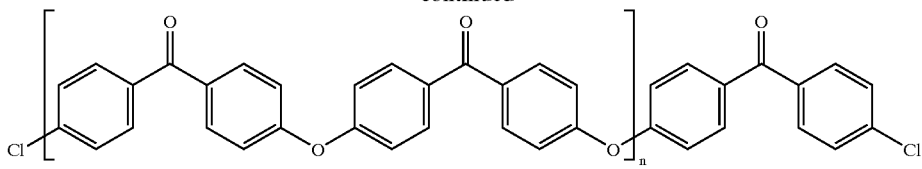

In the above formulae, n is not less than 2, preferably from 2 to 100.

Next, the monomers represented by the formulae (B-1) to (B-4) are described.

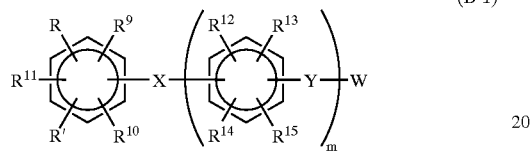
(B-1)

In the above formula, R and R', which may be the same or different, denote the same groups as in the formula (A).

$R^9$ to $R^{15}$, which may be the same or different, are independently at least one atom or group selected from hydrogen, a fluorine atom and an alkyl group.

Examples of the alkyl groups indicated by $R^9$ to $R^{15}$ include the same alkyl groups as indicated by $R^1$ to $R^8$ in the formula (A).

m is 0, 1 or 2.

X is a divalent electron attracting group selected from the same groups for X in the formula (A).

Y is a divalent electron donating group selected from the same groups for Y in the formula (A).

W is at least one group selected from the group consisting of a phenyl group, a naphthyl group and groups represented by the following formulae (C-1) to (C-3):

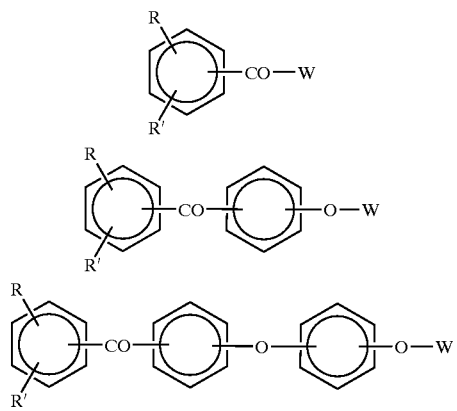

In the above formulae, A denotes an electron donating group or a single bond.

The electron donating group is a divalent electron donating group selected from the same groups for Y in the formula (A).

$R^{16}$ and $R^{17}$ are independently an atom or a group selected from the group consisting of hydrogen, an alkyl group and an aryl group.

Examples of the alkyl and aryl groups indicated by $R^{16}$ and $R^{17}$ include the same alkyl and aryl groups as indicated by $R^1$ to $R^8$ in the formula (A).

$R^{18}$ to $R^{26}$, which may be the same or different, are independently at least one atom or group selected from hydrogen, a fluorine atom and an alkyl group.

q is 0 or 1.

Examples of the monomers of the formula (B-1) include compounds represented by the following formulae:

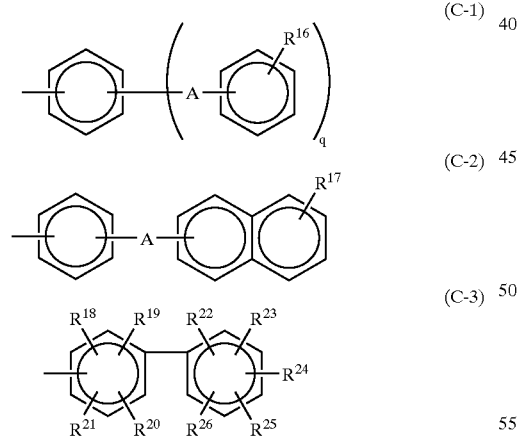

More specifically, the compounds of the formula (B-1) can be exemplified with the following compounds:

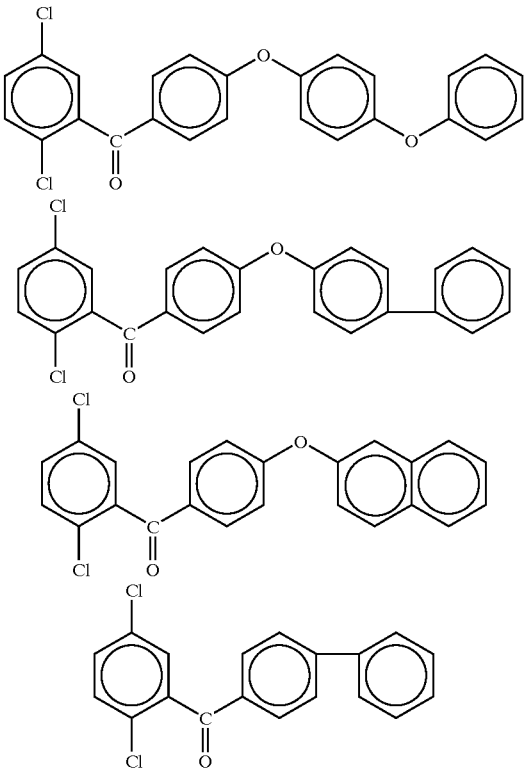

-continued

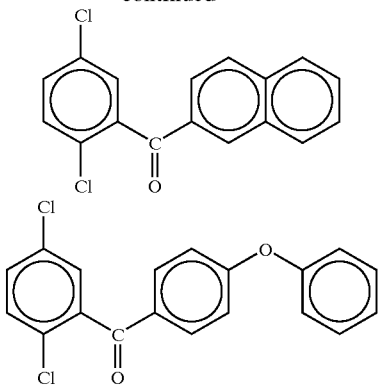

Further, corresponding compounds to the above compounds except the chlorine atom is replaced with a bromine atom or an iodine atom are also available.

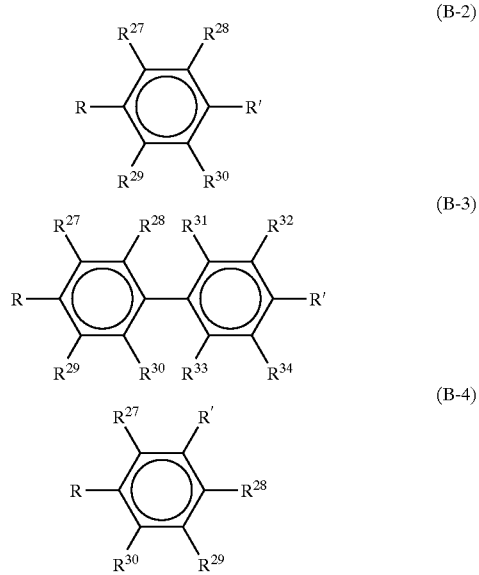

In the formulae (B-2) to (B-4), R and R' may be the same or different and denote the same groups as in the formula (A) $R^{27}$ to $R^{34}$, which may be the same or different, are independently hydrogen, a fluorine atom, an alkyl group, a fluorine-substituted alkyl group, an aryl group or a group represented by the following formula (D):

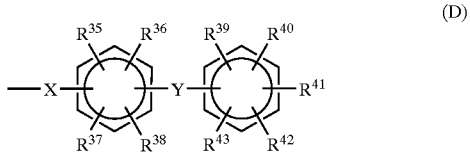

wherein $R^{35}$ to $R^{43}$, which may be the same or different, are independently hydrogen, a halogen atom, an alkyl group or a fluorine-substituted alkyl group.

Examples of the alkyl and fluorine-substituted alkyl groups indicated by $R^{27}$ to $R^{34}$ and $R^{35}$ to $R^{43}$ include the same alkyl and fluorine-substituted alkyl groups as indicated by $R^1$ to $R^8$. Examples of the aryl groups indicated by $R^{27}$ to $R^{34}$ include the same aryl groups as indicated by $R^1$ to $R^8$.

X is a divalent electron attracting group selected from the same groups for X in the formula (A).

Y is a divalent electron donating group selected from the same groups for Y in the formula (A).

Examples of the monomers represented by the formula (B-2) include p-dichlorobenzene, p-dimethylsulfonyloxybenzene, 2,5-dichlorotoluene, 2,5-dimethylsulfonyloxybenzene, 2,5-dichloro-p-xylene, 2,5-dichlorobenzotrifluoride, 4-dichloro-2,3,5,6-tetrafluorobenzene, and corresponding compounds to the above compounds except the chlorine atom is placed with a bromine atom or an iodine atom.

Examples of the monomers represented by the formula (B-3) include 4,4'-dimethylsulfonyloxybiphenyl, 4,4'-dimethylsulfonyloxy-3,3'-dipropenylbiphenyl, 4,4'-dibromobiphenyl, 4,4'-diiodobiphenyl, 4,4'-dimethylsulfonyloxy-3,3'-dimethylbiphenyl, 4,4'-dimethylsulfonyloxy-3,3'-difluorobiphenyl, 4,4'-dimethylsulfonyloxy-3,3',5,5'-tetrafluorobiphenyl, 4,4'-dibromooctafluorobiphenyl and 4,4'-dimethylsulfonyloxyoctafluorobiphenyl.

Examples of the monomers represented by the formula (B-4) include m-dichlorobenzene, m-dimethylsulfonyloxybenzene, 2,4-dichlorotoluene, 3,5-dichlorotoluene, 2,6-dichlorotoluene, 3,5-dimethylsulfonyloxytoluene, 2,6-dimethylsulfonyloxytoluene, 2,4-dichlorobenzotrifluoride, 3,5-dichlorobenzotrifluoride, 1,3-dibromo-2,4,5,6-tetrafluorobenzene, and corresponding compounds to the above compounds except the chlorine atom is replaced with a bromine atom or an iodine atom.

The monomers mentioned above are reacted in the presence of a catalyst to synthesize the polyarylene. The catalyst used herein is a catalyst system containing a transition metal compound. This catalyst system essentially contains (1) a transition metal salt and a compound which becomes a ligand (referred to as the "ligand component" hereinafter), or a transition metal complex (including a copper salt) in which a ligand is coordinated, and (2) a reducing agent. A "salt" may be added to increase the polymerization rate.

Examples of the transition metal salt include nickel compounds, such as nickel chloride, nickel bromide, nickel iodide and nickel acetylacetonate; palladium compounds, such as palladium chloride, palladium bromide and palladium iodide; iron compounds, such as iron chloride, iron bromide and iron iodide; and cobalt compounds, such as cobalt chloride, cobalt bromide and cobalt iodide. Of these, nickel chloride, nickel bromide and the like are particularly preferred.

Examples of the ligand component include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components can be used singly or in combination of two or more kinds.

Examples of the transition metal complex with a coordinated ligand include nickel chloride-bis(triphenylphosphine),
nickel bromide-bis(triphenylphosphine),
nickel iodide-bis(triphenylphosphine),
nickel nitrate-bis(triphenylphosphine),
nickel chloride(2,2'-bipyridine),
nickel bromide(2,2'-bipyridine),
nickel iodide(2,2'-bipyridine),
nickel nitrate(2,2'-bipyridine),
bis(1,5-cyclooctadiene)nickel,
tetrakis(triphenylphosphine)nickel, tetrakis(triphenylphosphite)nickel and tetrakis(triphenylphosphine)palladium. Of these, nickel chloride-bis(triphenylphosphine) and nickel chloride (2,2'-bipyridine) are preferred.

Examples of the reducing agent employable in the catalyst system include iron, zinc, manganese, aluminum, magnesium, sodium and calcium. Of these, zinc, magnesium and manganese are preferable. These reducing agents can be used in a more activated form by contact with an acid, e.g., an organic acid.

Examples of the "salt" employable in the catalyst system include sodium compounds, such as sodium fluoride, sodium chloride, sodium bromide, sodium iodide and sodium sulfate; potassium compounds, such as potassium fluoride, potassium chloride, potassium bromide, potassium iodide and potassium sulfate; and ammonium compounds, such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

With respect to the proportion of the components, the transition metal salt or the transition metal complex is used in amounts within the range of usually 0.0001 to 10 mol, preferably 0.01 to 0.5 mol, based on 1 mol of the total monomers. If the amount thereof is less than 0.0001 mol, the polymerization reaction does not proceed sufficiently in some cases. Contrary, the amount thereof exceeding 10 mol may result in a lowered molecular weight of the polyarylene.

When the catalyst system contains the transition metal salt and the ligand component, the ligand component is used in amounts within the range of usually 0.1 to 100 mol, preferably 1 to 10 mol, based on 1 mol of the transition metal salt. If the amount thereof is less than 0.1 mol, the catalytic activity sometimes becomes insufficient. Contrary, the amount thereof exceeding 100 mol may result in a lowered molecular weight of the polyarylene.

The amount of the reducing agent is in the range of usually 0.1 to 100 mol, preferably 1 to 10 mol, based on 1 mol of the total monomers. If the reducing agent is used within amounts less than 0.1 mol, the polymerization does not proceed sufficiently in some cases. Contrary, the amount thereof exceeding 100 mol may cause difficulties in purifying the resulting polyarylene.

When the "salt" is used, the amount thereof is in the range of usually 0.001 to 100 mol, preferably 0.01 to 1 mol, based on 1 mol of the total monomers. If the salt is used within amounts less than 0.001 mol, the effect of increasing the polymerization rate often cannot be achieved sufficiently. Contrary, the amount thereof exceeding 100 mol may result in difficult purification of the resulting polyarylene.

Exemplary solvents usable in the polymerization include tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam. Of these, tetrahydrofuran, N,N-dimethylformamide, N,N-dimethylacetamide and N-methyl-2-pyrrolidone are preferred. These polymerization solvents are preferably used after dried sufficiently.

The concentration of the total monomers in the polymerization solvent is in the range of usually 1 to 90 wt %, preferably 5 to 40 wt %.

The polymerization temperature is in the range of usually 0 to 200° C., preferably 50 to 120° C., and the polymerization time is in the range of usually 0.5 to 100 hours, preferably 1 to 40 hours.

By the polymerization of the monomer (A) of the formula (A) and at least one monomer (B) selected from the monomers of the formulae (B-1) to (B-4) as described above, a polymerization solution containing polyarylene is obtained.

The sulfonated copolymer for use in the electrolyte membrane can be obtained by introducing a sulfonic acid group into the above copolymer which has no sulfonic acid group by a conventional technique using a sulfonating agent.

For introduction of a sulfonic acid group, the copolymer having no sulfonic acid group can be sulfonated by use of a conventional sulfonating agent, such as anhydrous sulfuric acid, fuming sulfuric acid, chlorosulfonic acid, sulfuric acid or sodium hydrogen sulfite, under known conditions (see Polymer Preprints, Japan, vol. 42, No. 3, p. 730 (1993), Polymer Preprints, Japan, vol. 42, No. 3, p. 736 (1994), Polymer Preprints, Japan, vol. 42, No. 7, pp. 2490–2492 (1993)).

Namely, the conditions in the sulfonation are such that the copolymer having no sulfonic acid group is reacted with the sulfonating agent in the presence or absence of a solvent. Examples of the solvent include hydrocarbon solvents, such as n-hexane; ether solvents, such as tetrahydrofuran and dioxane; non-protonic polar solvents, such as dimethylacetamide, dimethylformamide and dimethyl sulfoxide; and halogenated hydrocarbons, such as tetrachloroethane, dichloroethane, chloroform and methylene chloride. Although the reaction temperature is not specifically limited, it is in the range of usually −50 to 200° C., preferably −10 to 100° C. The reaction time is in the range of usually 0.5 to 1000 hours, preferably 1 to 200 hours.

The sulfonated copolymer thus obtained will contain the sulfonic acid group in amounts within the range of 0.5 to 3 mg equivalent/g, preferably 0.8 to 2.8 mg equivalent/g. If the sulfonic acid group is contained in amounts less than 0.5 mg equivalent/g, the proton conductivity cannot be increased. Contrary, when the amount thereof exceeds 3 mg equivalent/g, hydrophilicity is so increased that the resulting polymer becomes water soluble or, if not water soluble, less durable.

The precursor polymer of the above-obtained sulfonated copolymer (i.e., prior to the sulfonation) has a weight-average molecular weight of 10,000 to 1,000,000, preferably 20,000 to 800,000, in terms of polystyrene. If the molecular weight is less than 10,000, the film performance is so insufficient that cracks occur in the dry film, and besides the film suffers poor strength. If the molecular weight exceeds 1,000,000, the polymer will have insufficient solubility and will increase viscosity of the solution, resulting in bad processability.

Method for the Production of Multilayers

In the method for producing multilayers according to the invention, a coating solution (I) which comprises the proton-conductive polymer in a dissolved or dispersed state and a solvent (Is) containing water in amounts from 25 to 60 wt % and an organic solvent in amounts from 75 down to 40 wt %, is applied on the electrode to form a first coating;

a coating solution (II) which comprises the proton-conductive polymer in a dissolved or dispersed state and a solvent (IIs) containing water in amounts from 0 to less than 25 wt % and an organic solvent in amounts above 75 wt %, is applied on the wet first coating without any drying of the first coating to form a second coating; and the coatings are dried to form an electrolyte membrane, so that a multilayer comprising the electrode and the electrolyte membrane is produced.

The proton-conductive polymers dissolved or dispersed individually in the coating solution (I) or (II) may be the same or different, and the organic solvents contained individually in the solvent (Is) or (IIs) also may be the same or different.

The coating solution (I) for direct application on the electrode ideally contains the proton-conductive polymer in amounts from 0.1 to 10 wt %, preferably 0.5 to 2 wt %, provided that the components for the coating solution (I) amount to 100 wt %.

The solvent (Is) ideally contains water in amounts from to 60 wt %, preferably 30 to 50 wt %, and the organic solvent in amounts from 75 down to 40 wt %, preferably from 70 down to 50 wt %, provided that water and the organic solvent amount to 100 wt %.

Examples of the organic solvent include tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam. Of these, tetrahydrofuran, N,N-dimethylformamide, N,N-dimethylacetamide and N-methyl-2-pyrrolidone are preferred. These organic solvents can be used singly or in combination of two or more kinds.

When the water content in the solvent (Is) for the coating solution (I) is less than 25 wt %, effects of suppressed penetration of the subsequently-applied coating solution (II), particularly the electrolyte membrane component, into the electrode will be deteriorated. On the other hand, the water content exceeding 60 wt % will cause ununiform dissolution or dispersion of the sulfonated polyarylene so that the homogenous coating can be hardly obtained.

The coating solution (I) can be applied on the electrode by bar coating or spray coating, preferably spray coating.

The wet coating of the coating solution (I) ranges from usually 2 to 100 μm, preferably 10 to 30 μm in the thickness.

After the coating solution (I) is applied on the electrode, the coating solution (II) is applied on the wet coating without any drying.

The coating solution (II) ideally contains the proton-conductive polymer in amounts from 5 to 20 wt %.

The solvent (IIs) ideally contains water in amounts from 0 to less than 25 wt %, preferably 10 to 20 wt %, and the organic solvent in amounts above 75 wt %, preferably from 80 to 90 wt %, provided that water and the organic solvent amount to 100 wt %.

Examples of the organic solvent used herein are as listed for the coating solution (I).

When the water content in the solvent (IIs) for the coating solution (II) is more than 25 wt %, the sulfonated polyarylene cannot have sufficiently high concentration in the coating solution so that the resulting electrolyte membrane will be unsatisfactory.

The coating solution (II) is preferably applied by means of a coater. Once applied, the coatings are dried at usually 50 to 180° C., preferably 100 to 150° C.

The dry film obtained from the coating solution (II) ranges from 10 to 100 μm, preferably 30 to 50 μm in the thickness.

The dry electrolyte membrane obtained from the coating solutions (I) and (II) ideally ranges from 10 to 200 μm, preferably 20 to 80 μm in the thickness.

As mentioned above, the coating solution (I) which contains the solvent (Is) of the water content within 25 to 60 wt % is applied first, and subsequently the coating solution (II) which contains the solvent (IIs) of the water content within 0 to less than 25 wt % is applied on the undried first coating. As a result, the coating of the coating solution (II) is formed on the coating of the coating solution (I). Therefore the electrolyte membrane component in the coating solution (II) solidifies (phase transition) on the coating of the coating solution (I), so that the electrolyte membrane component in the coating solution (II) can be prevented from penetrating into the electrode.

In the invention, a third coating solution (III) may be further applied on the coating of the coating solution (II).

The coating solution (III) is obtained by dissolving the sulfonated polymer in a mixed solvent consisting of an alcohol with a boiling point of 100° C. or below and an organic solvent with a boiling point of above 100° C.

Examples of the sulfonated polymer used herein include the same sulfonated polymers used in production of the coating solutions.

Exemplary alcohols with boiling points of 100° C. or below include methanol, ethanol, propanol and isopropyl alcohol.

Exemplary organic solvents with boiling points of above 100° C. include N,N-dimethylformamide, N,N-dimethylacetamide, N-methyl-2-pyrrolidone, γ-butyrolactone, tetramethylurea, dimethyl sulfoxide, hexamethylphosphoric triamide and sulfolane.

The weight ratio between the alcohol with a boiling point of 100° C. or below and the organic solvent with a boiling point of above 100° C., is in the range of 5–75:95–25, with the proviso that the total is 100.

The concentration of the sulfonated polymer in the coating solution (III) is ideally in the range of 1 to 50 wt %, preferably 3 to 30 wt %.

The coating solution (III) can be applied on the coatings over the electrode by, for example, bar coating or spray coating. The thickness of the coating of the coating solution (III) is in the range of 1 to 100 μm.

After the application of the coating solution (III), the coatings are dried by heating at temperatures from 50 to 200° C., preferably 50 to 150° C., for a period of 15 minutes to 3 hours, preferably 30 minutes to 2 hours.

EXAMPLES

The present invention is further described with reference to the following Examples, but it should be construed that the invention is in no way limited to those Examples.

Preparation of Coating Solutions

1. Preparation of Coating Solutions (I)

(1) Preparation of the Coating Solution A

Into a 250 ml polybottle was introduced 1.0 g of a sulfonated copolymer (sulfonic acid concentration (hereinafter "IEC")=2.10 meq/g) that had Mn of 50,000 and Mw of 150,000. The copolymer comprised 2,5-dichloro-4'-(4-phenoxy)phenoxybenzophenone (hereinafter "2,5-DCPPB") and a (both ends) chlorobenzoyl-terminated condensate of 4,4'-dichlorobenzophenone and 2,2-bis(4-hydroxyphenyl)-1,1,1,3,3,3-hexafluoropropane (Mn=11,200, Mw=127,500, hereinafter "oligo-BCPAF") in a 97:3 molar ratio. Distilled water 50 g, methyl ethyl ketone (hereinafter "MEK") 44 g and N-methyl-2-pyrrolidone (hereinafter "NMP") 5 g were added into the bottle, and the contents were stirred by a wave rotor for 20 hours to obtain a coating solution A having a viscosity of 48 mPa·s (25° C.).

(2) Preparation of the Coating Solution B

Into a 250 ml polybottle was introduced 0.5 g of a sulfonated copolymer (IEC=2.10 meq/g) that had Mn of 50,000 and Mw of 150,000. The copolymer comprised 2,5-DCPPB and oligo-BCPAF (Mn=11,200 and Mw=27,500) in a 97:3 molar ratio. Distilled water 40 g, tetrahydrofuran (hereinafter "THF") 54.5 g and NMP 5 g were added into the bottle, and the contents were stirred by a wave rotor for 20 hours to obtain a coating solution B having a viscosity of 40 mPa·s (25° C.).

(3) Preparation of the Coating Solution C

Into a 250 ml polybottle was introduced 2.0 g of a sulfonated tetrafluoroethylene copolymer (trade name: Nafion 117 available from Du Pont Kabushiki Kaisha). Distilled water 40 g, methanol 10 g, isopropyl alcohol 20 g and normal propyl alcohol 28 g were added into the bottle, and the contents were stirred by a wave rotor for 20 hours to obtain a coating solution C having a viscosity of 78 mPa·s (25° C.).

(4) Preparation of the Coating Solution D

Into a 250 ml polybottle was introduced 0.5 g of a sulfonated copolymer (IEC=2.10 meq/g) that had Mn of 50,000 and Mw of 150,000. The copolymer comprised 2,5-DCPPB and oligo-BCPAF (Mn=11,200 and Mw=27,500) in a 97:3 molar ratio. Distilled water 75 g, THF 20.5 g and NMP 4 g were added into the bottle, and the contents were stirred by a wave rotor for 20 hours to obtain a coating solution D having a viscosity of 30 mPa·s (25° C.)

(5) Preparation of the Coating Solution E

Into a 250 ml polybottle was introduced 0.5 g of a sulfonated copolymer (IEC=2.10 meq/g) that had Mn of 50,000 and Mw of 150,000. The copolymer comprised 2,5-DCPPB and oligo-BCPAF (Mn=11,200 and Mw=27,500) in a 97:3 molar ratio. Distilled water 5 g, THF 20.5 g and NMP 74 g were added into the bottle, and the contents were stirred by a wave rotor for hours to obtain a coating solution E having a viscosity of 58 mPa·s (25° C.)

2. Preparation of Coating Solutions (II)

(1) Preparation of the Coating Solution 1

Into a 250 ml polybottle was introduced 10 g of a sulfonated copolymer (IEC=2.10 meq/g) that had Mn of 50,000 and Mw of 150,000. The copolymer comprised 2,5-DCPPB and oligo-BCPAF (Mn=11,200 and Mw=27,500) in a 97:3 molar ratio. Distilled water 20 g, THF 50 g and NMP 20 g were added into the bottle, and the contents were stirred by a wave rotor for hours to obtain a coating solution 1 having a viscosity of 5290 mPa·s (25° C.).

(2) Preparation of the Coating Solution 2

Into a 250 ml polybottle was introduced 10 g of a sulfonated copolymer (IEC=2.10 meq/g) that had Mn of 50,000 and Mw of 150,000. The copolymer comprised 2,5-DCPPB and oligo-BCPAF (Mn=11,200 and Mw=27,500) in a 97:3 molar ratio. NMP 90 g was added into the bottle and the contents were stirred by a wave rotor for 20 hours to obtain a coating solution 2 having a viscosity of 2230 mPa·s (25° C.).

Observation of cross section, measurement of specific surface area of all pores and evaluation of power generation properties were carried out for the multilayers obtained in the following Examples and Comparative Examples by the following manners.

Observation of Cross Section

Each multilayer was cut with a microtome, and the exposed cross section was observed by a scanning electron microscope (SEM) to examine the degree of penetration of the coating solution into the electrode.

Measurement of Specific Surface Area of All Pores

The specific surface area of all the pores in the electrode of each multilayer was measured by a mercury penetration method using an automatic porosimeter.

Evaluation of Power Generation Properties

The every coating solutions (I) and (II) were sequentially applied on a platinum-catalyst-supported gas diffusion electrode and there after dried to form an electrolyte membrane. Another gas diffusion electrode of the same type was superposed over the electrolyte membrane, so that an electrodes assembly was obtained. The electrodes assembly was sandwiched between two titanium current collectors, and heaters were arranged outside the assembly. The fuel battery thus constructed had an effective area of 25 $cm^2$.

The temperature of the fuel battery was maintained at 75° C., and the fuel electrode and the oxidation electrode were supplied with hydrogen at 35% RH and oxygen at 65% RH respectively under 2 atm. The terminal voltage at a current density of 1 $A/cm^2$ was measured as the initial voltage.

Example 1

The coating solution (I)-A was applied on an electrode of a 1 $mg/cm^2$ platinum-supported gas diffusion electrode (manufactured by U.S. Electrochem Inc.) by a spray, and the coating solution (II)-1 was applied on the undried coating of the coating solution A by means of a coater with a doctor blade. Then the coatings of the coating solutions (I)-A and (II)-1 were dried by heating at 100° C. for 1 hour to give a 40 μm membrane of the proton-conductive sulfonated polymer, thereby obtaining a multilayer.

The observation of cross section, measurement of specific surface area of all pores and evaluation of power generation properties were conducted as mentioned above. The results were that any penetration of the electrolyte into the electrode was not confirmed by the SEM observation on the cross section, that the specific surface area of all the pores in the electrode had changed very little according to the measurement of specific surface area of all pores, and that the terminal voltage (initial voltage) was 0.60 V in the evaluation of power generation properties.

The results are shown in Tables 1–3 by category.

Examples 2–4

Multilayers were produced in the same manner as in Example 1, except that the coating solutions (I) and (II) were used in the combinations shown in Table 1.

The results of the SEM observation of cross section, measurement of specific surface area of all pores by the automatic porosimeter and evaluation of power generation properties were shown in Tables 1–3 by category.

Comparative Example 1

The coating solution (I)-D was sprayed in the same manner as in Example 1, but the solution was repelled and scattered like droplets so that it formed an ununiform coating on the electrolyte membrane of the electrode. Then the coating solution (II)-1 was applied on the undried coating of the coating solution D by means of a coater in the same manner as in Example 1, thereby obtaining a multilayer.

The results of the SEM observation of cross section, measurement of specific surface area of all pores by the automatic porosimeter and evaluation of power generation properties were shown in Tables 1–3 by category.

same manner as in Example 1, thereby obtaining a multilayer.

The results of the SEM observation of cross section, measurement of specific surface area of all pores by the automatic porosimeter and evaluation of power generation properties were shown in Tables 1–3 by category.

TABLE 1

Results of SEM observation

| | coating solution (I)<br>(water content in solvent) | coating solution (II)<br>(water content in solvent) | SEM observation result |
|---|---|---|---|
| Ex. 1 | A (50.5% water)<br>E:W:M:N = 1:50:44:5 | 1 (22.2% water)<br>E:W:T:N = 10:20:50:20 | no penetration |
| Ex. 2 | B (40.2% water)<br>E:W:T:N = 0.5:40:54.5:5 | 1 (22.2% water)<br>E:W:T:N = 10:20:50:20 | no penetration |
| Ex. 3 | C (40.8% water)<br>NAF:W:Me:IP:NP = 2:40:10:20:28 | 1 (22.2% water)<br>E:W:T:N = 10:20:50:20 | no penetration |
| Ex. 4 | A (50.5% water)<br>E:W:M:N = 1:50:44:5 | 2 (0% water)<br>E:N = 10:90 | no penetration |
| Comp. Ex. 1 | D (75.4% water)<br>E:W:T:N = 0.5:75:20.5:4 | 1 (22.2% water)<br>E:W:T:N = 10:20:50:20 | slight penetration |
| Comp. Ex. 2 | E (5.0% water)<br>E:W:T:N = 0.5:5:20.5:74 | 1 (22.2% water)<br>E:W:T:N = 10:20:50:20 | slight penetration |
| Comp. Ex. 3 | not used | 1 (22.2% water)<br>E:W:T:N = 10:20:50:20 | penetration into electrode |
| Comp. Ex. 4 | not used | 2 (0% water)<br>E:N = 10: 90 | penetration into electrode |

E: Sulfonated polymer,
W: Distilled water,
M: MEK,
N: NMP,
T: THF
NAF: Sulfonated tetrafluoroethylene copolymer,
Me: Methanol
IP: Isopropyl alcohol,
NP: Normal propyl alcohol automatic porosimeter and evaluation of power generation properties were shown in Tables 1–3 by category.

Comparative Example 2

The coating solution (I)-E was sprayed in the same manner as in Example 1 and penetration of the solution into the electrode was confirmed. Then the coating solution (II)-1 was applied on the undried coating of the coating solution E, thereby obtaining a multilayer.

The results of the SEM observation of cross section, measurement of specific surface area of all pores by the automatic porosimeter and evaluation of power generation properties were shown in Tables 1–3 by category.

Comparative Example 3

Without applying any coating solution (I), the coating solution (II)-1 alone was applied by means of a coater in the same manner as in Example 1, thereby obtaining a multilayer.

The results of the SEM observation of cross section, measurement of specific surface area of all pores by the automatic porosimeter and evaluation of power generation properties were shown in Tables 1–3 by category.

Comparative Example 4

Without applying any coating solution (I), the coating solution (II)-2 alone was applied by means of a coater in the In Examples, the coating solution (I) with the water content in the solvent within 25 to 60 wt % was applied on the electrode, and the coating solution (II) with the water content in the solvent less than 25 wt % was applied on the wet first coating without any drying of the first coating. As a result, the coating of the coating solution (II) was formed on the coating of the coating solution (I). Therefore the electrolyte membrane component in the coating solution (II) solidified (phase transition) on the coating of the coating solution (I), so that the electrolyte membrane component in the coating solution (II) was prevented from penetrating into the electrode.

However in Comparative Example 1, since the coating solution (I)-D contained water in a too large amount, it was repelled and scattered on the water-repellent electrode surface. As a result, the coating of the coating solution D became ununiform to cause penetration of the subsequently-applied coating solution (II)-1 into the electrode.

In Comparative Example 2, since the coating solution (I)-E contained water in a too small amount, it penetrated into the electrode aid entered some pores in the electrode. Also, the coating of the coating solution (I)-E was ununiform to cause penetration of the subsequently-applied coating solution (II)-1 into the electrode.

TABLE 2

Results of measurement of specific surface area of all pores

| | coating solution (I) (water content in solvent) | coating solution (II) (water content in solvent) | specific surface area of all pores (m²/cm²) |
|---|---|---|---|
| Ex. 1 | A (50.5% water) E:W:M:N = 1:50:44:5 | 1 (22.2% water) E:W:T:N = 10:20:50:20 | 5.75 (good) |
| Ex. 2 | B (40.2% water) E:W:T:N = 0.5:40:54.5:5 | 1 (22.2% water) E:W:T:N = 10:20:50:20 | 5.74 (good) |
| Ex. 3 | C (40.8% water) NAF:W:Me:IP:NP = 2:40:10:20:28 | 1 (22.2% water) E:W:T:N = 10:20:50:20 | 5.77 (good) |
| Ex. 4 | A (50.5% water) E:W:M:N = 1:50:44:5 | 2 (0% water) E:N = 10:90 | 5.76 (good) |
| Comp. Ex. 1 | D (75.4% water) E:W:T:N = 0.5:75:20.5:4 | 1 (22.2% water) E:W:T:N = 10:20:50):20 | 5.20 (rather good) |
| Comp. Ex. 2 | E (5.0% water) E:W:T:N = 0.5:5:20.5:74 | 1 (22.2% water) E:W:T:N = 10:20:50:20 | 5.18 (rather good) |
| Comp. Ex. 3 | not used | 1 (22.2% water) E:W:T:N = 10:20:50:20 | 5.17 (rather good) |
| Comp. Ex. 4 | not used | 2 (0% water) E:N = 10:90 | 1.59 (bad) |
| Control | — | — | 5.78 |

TABLE 3

Power generation properties

| | Initial voltage (V) |
|---|---|
| Example 1 | 0.60 |
| Example 2 | 0.58 |
| Example 3 | 0.57 |
| Example 4 | 0.59 |
| Comparative Example 1 | 0.22 |
| Comparative Example 2 | — |
| Comparative Example 3 | 0.24 |
| Comparative Example 4 | — |

—: Unmeasurable due to insufficient current below 1 A/cm²

EFFECT OF THE INVENTION

According to the invention, the electrolyte membrane can be formed on the electrode without causing any penetration of the electrolyte so that the resulting multilayer can attain excellent power generation properties as an electrode structure.

What is claimed is:

1. A method for the production of a multilayer comprising an electrode and an electrolyte membrane, said method comprising:

applying a coating solution (I) which comprises a dissolved or dispersed proton-conductive polymer and a solvent (Is) containing water in amounts from 25 to 60 wt % and an organic solvent in amounts from 75 down to 40 wt %, on an electrode;

applying a coating solution (II) which comprises a dissolved or dispersed proton-conductive polymer and a solvent (IIs) containing water in amounts from 0 to less than 25 wt % and an organic solvent in amounts above 75 wt % to form, on the first coating without any drying of said first coating; and drying the coatings to form an electrolyte membrane.

2. The method for the production of a multilayer according to claim 1, wherein the proton-conductive polymer is sulfonated polyarylene.

3. The method for the production of a multilayer according to claim 1, wherein the solvent (Is) contains water in amounts from 30 to 50 wt % and an organic solvent in amounts from 70 down to 50 wt %.

4. The method for the production of a multilayer according to claim 1, wherein the solvent (IIs) contains water in amounts from 10 to 20 wt % and an organic solvent in amounts from 90 down to 80 wt %.

5. The method for the production of a multilayer according to claim 1, wherein the coating solution (I) contains the proton-conductive polymer in amounts from 0.1 to 10 wt %.

6. The method for the production of a multilayer according to claim 1, wherein the coating solution (II) contains the proton-conductive polymer in amounts from 5 to 20 wt %.

7. The method for the production of a multilayer according to claim 1, wherein the organic solvent is at least one solvent selected from the group consisting of tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam, preferably from the group consisting of tetrahydrofuran, N,N-dimethylformamide, N,N-dimethylacetamide and N-methyl-2-pyrrolidone.

* * * * *